US009607076B2

(12) United States Patent
Kawabuchi et al.

(10) Patent No.: US 9,607,076 B2
(45) Date of Patent: Mar. 28, 2017

(54) DEVICE AND METHOD FOR DETERMINING INTEREST, AND COMPUTER-READABLE STORAGE MEDIUM FOR COMPUTER PROGRAM

(71) Applicant: KONICA MINOLTA, INC., Chiyoda-ku (JP)

(72) Inventors: Yoichi Kawabuchi, Itami (JP); Satoshi Deishi, Ibaraki (JP); Kagumi Moriwaki, Kawanishi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 273 days.

(21) Appl. No.: 14/297,659

(22) Filed: Jun. 6, 2014

(65) Prior Publication Data
US 2014/0365510 A1 Dec. 11, 2014

(30) Foreign Application Priority Data
Jun. 11, 2013 (JP) ................................ 2013-122309

(51) Int. Cl.
G06F 7/04 (2006.01)
G06F 17/30 (2006.01)
G06F 17/27 (2006.01)

(52) U.S. Cl.
CPC ...... *G06F 17/30616* (2013.01); *G06F 17/277* (2013.01); *G06F 17/30011* (2013.01); *G06F 17/3053* (2013.01)

(58) Field of Classification Search
None
See application file for complete search history.

(56) References Cited

U.S. PATENT DOCUMENTS 5,987,460 A * 11/1999 Niwa ................ G06F 17/30696
6,823,333 B2 * 11/2004 McGreevy ........ G06F 17/30395
(Continued)

FOREIGN PATENT DOCUMENTS

JP 2002-056009 A 2/2002
JP 2003-281183 A 10/2003
(Continued)

OTHER PUBLICATIONS

Office Action (Notification of Reason(s) for Refusal) issued on Jun. 2, 2015, by the Japanese Patent Office in corresponding Japanese Patent Application No. 2013-122309, and an English Translation of the Office Action. (9 pages).

*Primary Examiner* — Bruce Moser
(74) *Attorney, Agent, or Firm* — Buchanan Ingersoll & Rooney PC

(57) ABSTRACT

A device for determining interest includes a storage portion configured to store, on a user-by-user basis, a co-occurrence frequency in correlation with a user, the co-occurrence frequency indicating how many times a pair of words is used in a same cluster of a first document, on a pair-by-pair basis, to which the user gained access previously; a designating portion configured to allow a person who is to conduct a search to designate a second document and any one of the users; and a determination portion configured to determine that, among the pairs, a pair which is used in a same cluster of the designated second document and which also satisfies a predetermined condition of the co-occurrence frequency corresponding to the designated user is a particular pair in the second document which is probably of high interest to the designated user.

18 Claims, 17 Drawing Sheets

(56) References Cited

U.S. PATENT DOCUMENTS

| | | | | |
|---|---|---|---|---|
| 9,201,876 B1* | 12/2015 | Kumar | .................... | G06F 17/30 |
| 2004/0230577 A1* | 11/2004 | Kawatani | ............ | G06F 17/3071 |
| 2005/0165736 A1* | 7/2005 | Oosta | ................ | G06F 17/30713 |
| 2010/0070512 A1* | 3/2010 | Thurlow | ........... | G06F 17/30707 707/750 |
| 2010/0262454 A1* | 10/2010 | Sommer | ................ | G06Q 30/02 706/20 |
| 2014/0163953 A1* | 6/2014 | Parikh | .................. | G06F 17/276 704/9 |

FOREIGN PATENT DOCUMENTS

| | | | | |
|---|---|---|---|---|
| JP | 2008-203997 A | 9/2008 | | |
| JP | 2008-242515 A | 10/2008 | | |
| JP | WO 2010061537 A1 * | 6/2010 | ....... | G06F 17/30687 |
| JP | 2012-003603 A | 1/2012 | | |

* cited by examiner

DEVICE AND METHOD FOR DETERMINING INTEREST, AND COMPUTER-READABLE STORAGE MEDIUM FOR COMPUTER PROGRAM

This application is based on Japanese patent application No. 2013-122309 filed on Jun. 11, 2013, the contents of which are hereby incorporated by reference.

BACKGROUND OF THE INVENTION

1. Field of the Invention

The present invention relates to a technology for determining a plurality of words to reflect user interest.

2. Description of the Related Art

Many technologies for information retrieval have conventionally been proposed. For example, a technology is widely used for retrieving a document containing a word designated as a search key by a person who conducts a search.

Advanced technologies have also been proposed as follows. When a sentence is input from a user together with an image, information on relation between words in the input sentence is extracted by a related information extraction part, and is recorded in a related-information recording part. Thereafter, when a new sentence is input, related information in the input sentence is extracted, the extracted related information and the related information recorded in the related-information recording part are compared, and the image associated with similar related information is presented (Japanese Laid-open Patent Publication No. 2008-242515).

A set of candidate document information including at least one piece of document information is retrieved from a set of document information according to the relationship between a word included in a retrieval request and a word included in each piece of document information in the set of document information. Document information related to the retrieval request is retrieved from the set of the candidate document information according to the relationship between the words in the retrieval request and the relationship between the words in each of the candidate document information (Japanese Laid-open Patent Publication No. 2003-281183).

A word is designated, retrieval is performed and a document group to be an object is selected. The document is subjected to a morphological analysis, words are extracted and a word under consideration is selected on the basis of the number of frequencies. The cooccurrence relations (cooccurrence graph) of the word under consideration are detected in the sentence unit of each document. A cooccurrence graph included in many sentences is selected as a conceptual graph, and the conceptual vector of a document to be written is decided as to whether to include the conceptual graph. A document is classified and displayed according to the conceptual vector so that the document may be selected (Japanese Laid-open Patent Publication No. 2002-056009).

In the meantime, while a user reads a document, he/she sometimes desires to refer to another document which is related to the document read by him/her and is of interest to him/her. Alternatively, while a user reads a document, he/she sometimes desires to refer to another document which is related to the document read by him/her and is of interest to another user.

In such cases, the user probably conducts a search by using, as a search key, a plurality of words reflecting the interest. The use of words makes it possible to refine the search for documents to be referred to.

However, each user has its own interest therefore different needs. It is thus difficult to determine a plurality of words used as the search key.

Meanwhile, technologies have been proposed for determining on which part of a document a user focuses attention by detecting the current page or the line of sight of the user. Such technologies, however, are extensive.

SUMMARY

The present invention has been achieved in light of such an issue, and an object thereof is to determine a plurality of words to reflect interest of a specific user more easily than is conventionally possible.

According to one aspect of the present invention, a device for determining interest includes a storage portion configured to store, on a user-by-user basis, a co-occurrence frequency in correlation with a user, the co-occurrence frequency indicating how many times a pair of words is used in a same cluster of a first document, on a pair-by-pair basis, to which the user gained access previously; a designating portion configured to allow a person who is to conduct a search to designate a second document and any one of the users; and a determination portion configured to determine that, among the pairs, a pair which is used in a same cluster of the designated second document and which also satisfies a predetermined condition of the co-occurrence frequency corresponding to the designated user is a particular pair in the second document which is probably of high interest to the designated user. The cluster is, for example, a sentence, paragraph, chapter, clause, or section.

These and other characteristics and objects of the present invention will become more apparent by the following descriptions of preferred embodiments with reference to drawings.

DESCRIPTION OF THE PREFERRED EMBODIMENTS

Figure 1:
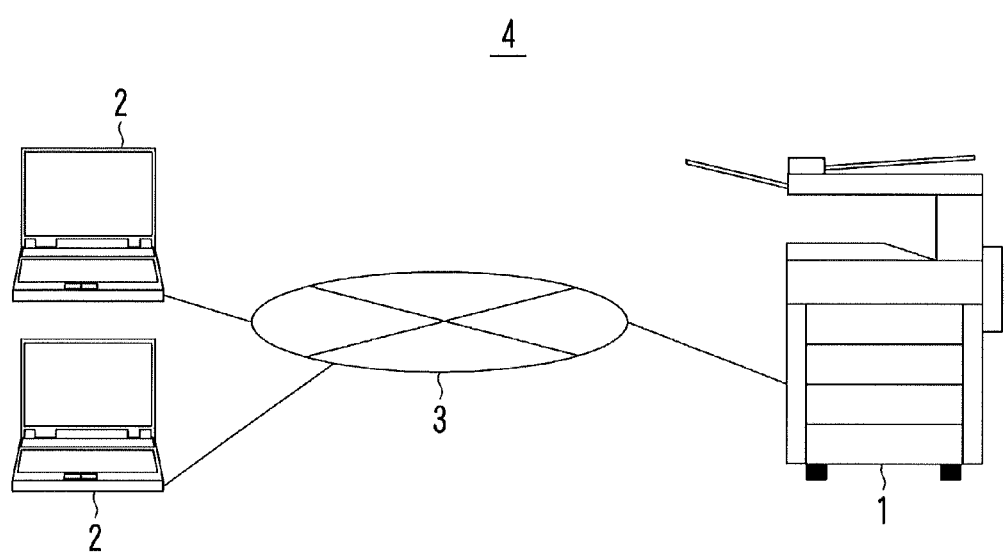
FIG. 1 is a diagram showing an example of the overall configuration of an intranet.
Figure 2:
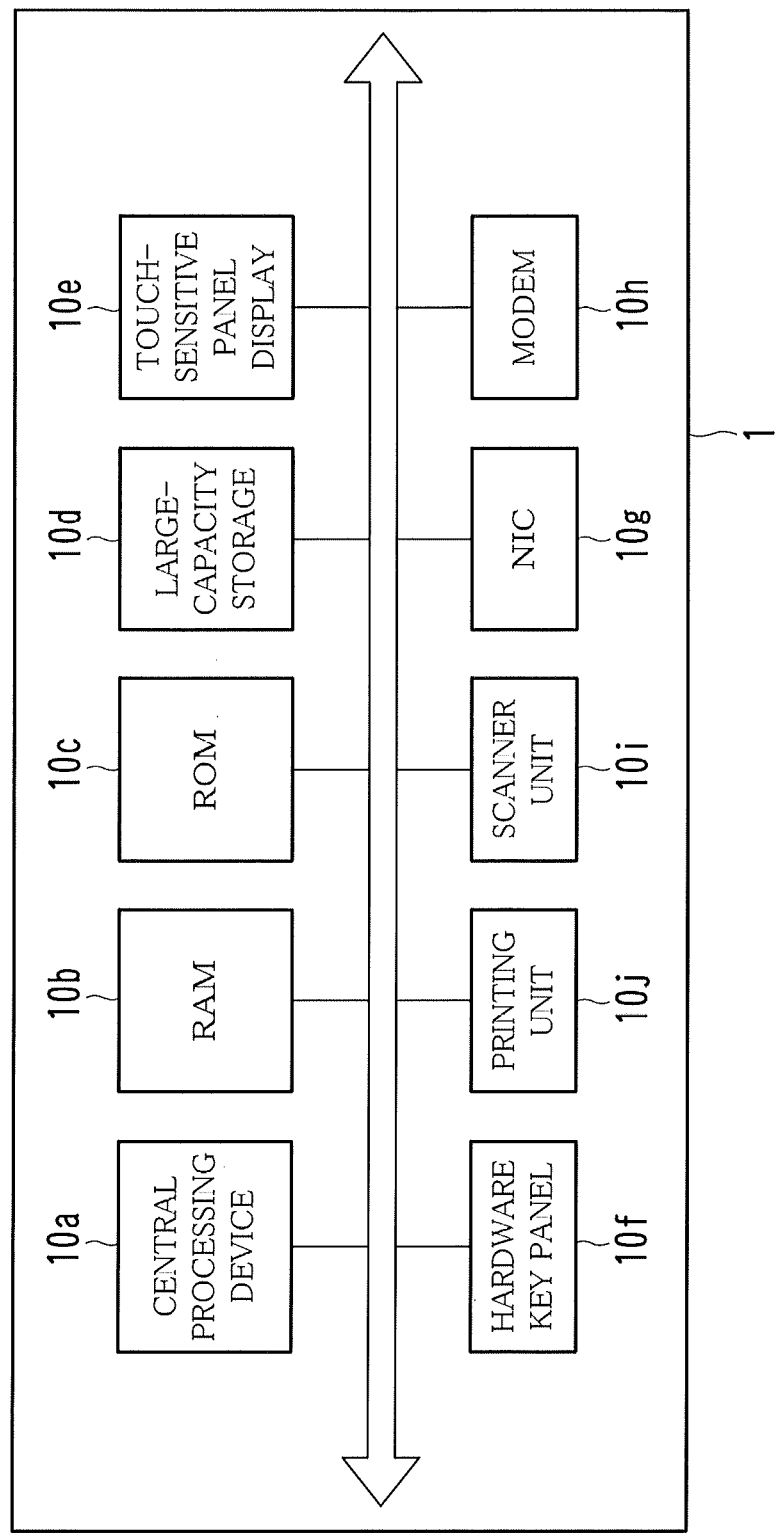
FIG. 2 is a diagram showing an example of the hardware configuration of an image forming apparatus.
Figure 3:
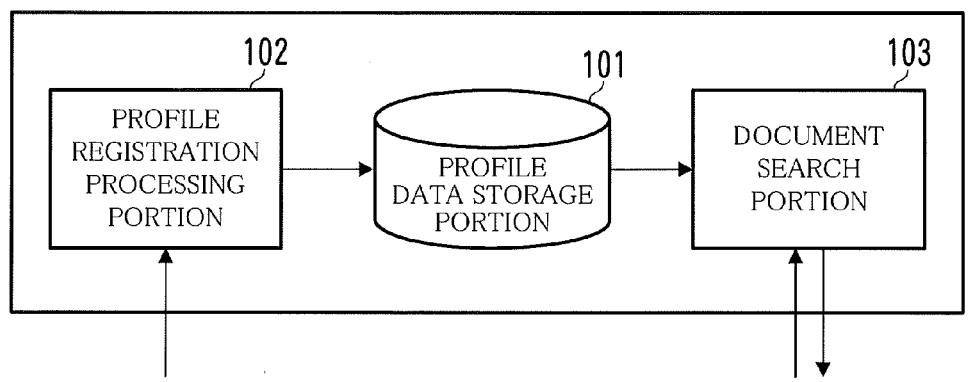
FIG. 3 is a diagram showing an example of the functional configuration of an image forming apparatus.

FIG. 1 is a diagram showing an example of the overall configuration of an intranet 4. FIG. 2 is a diagram showing an example of the hardware configuration of an image forming apparatus 1. FIG. 3 is a diagram showing an example of the functional configuration of the image forming apparatus 1.

As shown in FIG. 1, the intranet 4 is configured of the image forming apparatus 1, at least one terminal 2, a communication line 3, and so on.

The image forming apparatus 1 is configured to perform communication with each of the terminals 2 via the communication line 3. Examples of the communication line 3 are a Local Area Network (LAN), a public line, a dedicated line, and the Internet.

The intranet 4 is used by members of organizations such as corporations, government offices, and schools. Thus, the members thereof are users of the intranet 4. Each of the users is given a unique user code for identifying the subject user.

The image forming apparatus 1 is an apparatus into which functions such as copying, network printing, scanning, faxing, and a box function are consolidated. The image forming apparatus 1 is generally called a "multifunction device" or a "Multi-Functional Peripheral (MFP)".

The "network printing function" is to print an image onto paper based on image data received from the terminal 2. The network printing function is sometimes called a "network printer function" or "PC print function".

According to the "box function", a storage area called a "box" or "personal box" is allocated to each user. The box function enables each user to save data, e.g., image data, to his/her storage area and to manage the data therein. The box corresponds to a "folder" or "directory" in a personal computer.

Referring to FIG. 2, the image forming apparatus 1 is configured of a central processing device 10a, a Random Access Memory (RAM) 10b, a Read Only Memory (ROM) 10c, a large-capacity storage 10d, a touch-sensitive panel display 10e, a hardware key panel 10f, a Network Interface Card (NIC) 10g, a modem 10h, a scanner unit 10i, a printing unit 10j, and so on.

The touch-sensitive panel display 10e selectively displays, for example, a screen for presenting messages to a user, a screen for showing the results of processing, and a screen for allowing a user to input data and commands to be given to the image forming apparatus 1. The touch-sensitive panel display 10e detects a position touched by a user and informs the central processing device 10a of the touched position.

The hardware key panel 10f includes a numeric keypad, a start key, a stop key, and a function key that are not software keys but hardware keys.

A user operates the touch-sensitive panel display 10e or the hardware key panel 10f to give commands to the image forming apparatus 1 and enter data thereinto.

The NIC 10g performs communication with the terminal 2, a device such as a server external to the intranet 4, and so on in accordance with a protocol such as Transmission Control Protocol/Internet Protocol (TCP/IP).

The modem 10h performs communication with a facsimile terminal in accordance with a protocol such as G3.

The scanner unit 10i optically reads a document image such as character string, photo, picture, graphics, or chart recorded on a sheet of paper, and generates image data thereof.

The printing unit 10j prints, onto paper, a document image based on the image data captured by the scanner unit 10i or image data received from another device.

The ROM 10c or the large-capacity storage 10d stores, therein, a program for implementing the functions of a profile data storage portion 101, a profile registration processing portion 102, a document search portion 103, and so on all of which are shown in FIG. 3. The program is loaded into the RAM 10b as necessary, and is executed by the central processing device 10a.

The profile data storage portion 101 stores, therein, personal profile data 5KD (see FIG. 4) for each user. The profile registration processing portion 102 performs processing for registering and updating the personal profile data 5KD. The document search portion 103 searches for a document based on the personal profile data 5KD. The profile data storage portion 101, the profile registration processing portion 102, and the document search portion 103 will be detailed later.

The large-capacity storage 10d may be, for example, a hard disk or a non-volatile storage medium such as a Solid State Drive (SSD). The central processing device 10a may be, for example, a Central Processing Unit (CPU) or a Micro Processing Unit (MPU).

The terminal 2 is a client with which a user uses services provided by the image forming apparatus 1. Examples of the terminal 2 are a personal computer, a smartphone, and a tablet computer.

Figure 4:
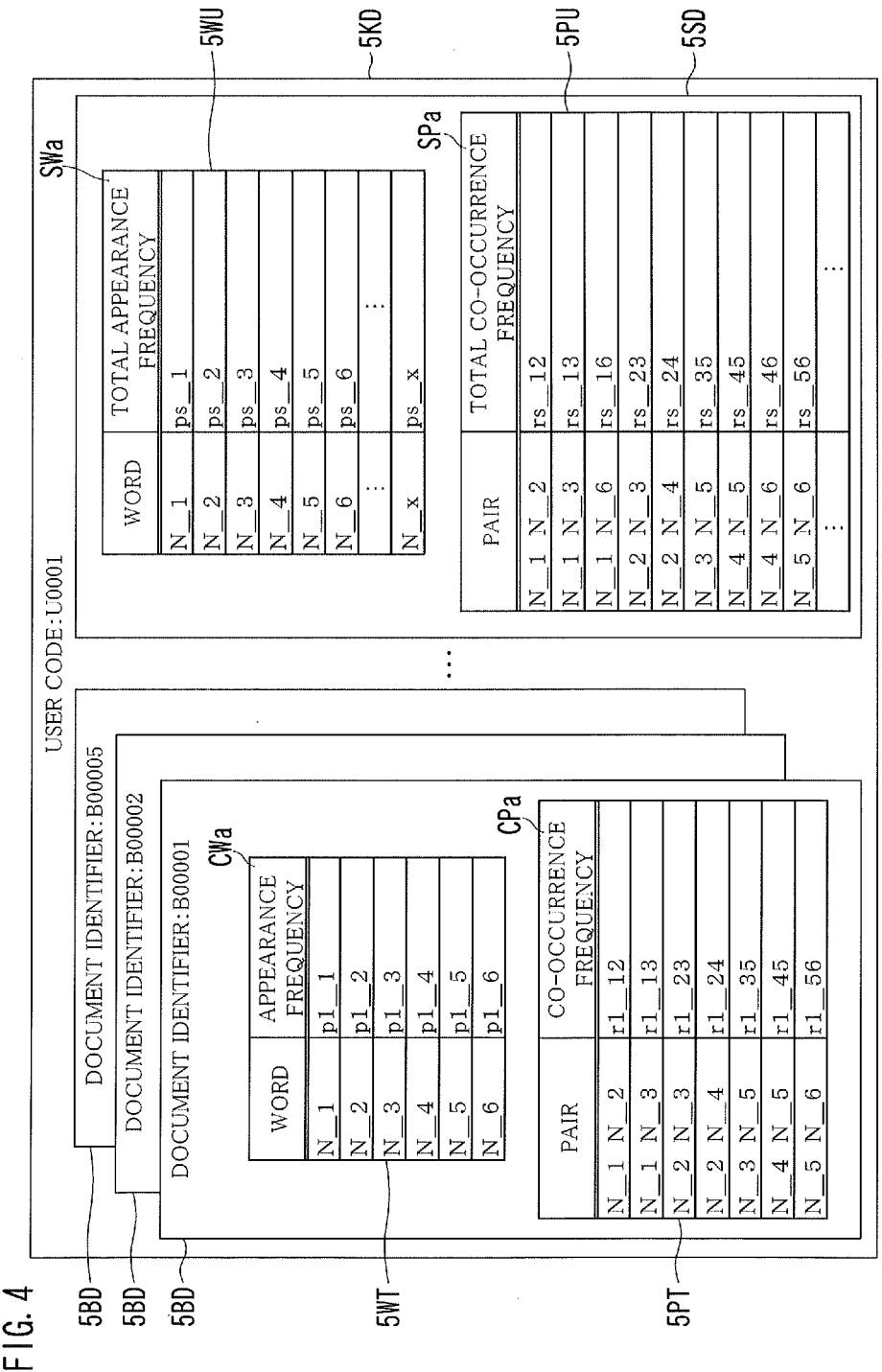
FIG. 4 is a diagram showing an example of personal profile data.
Figure 5:
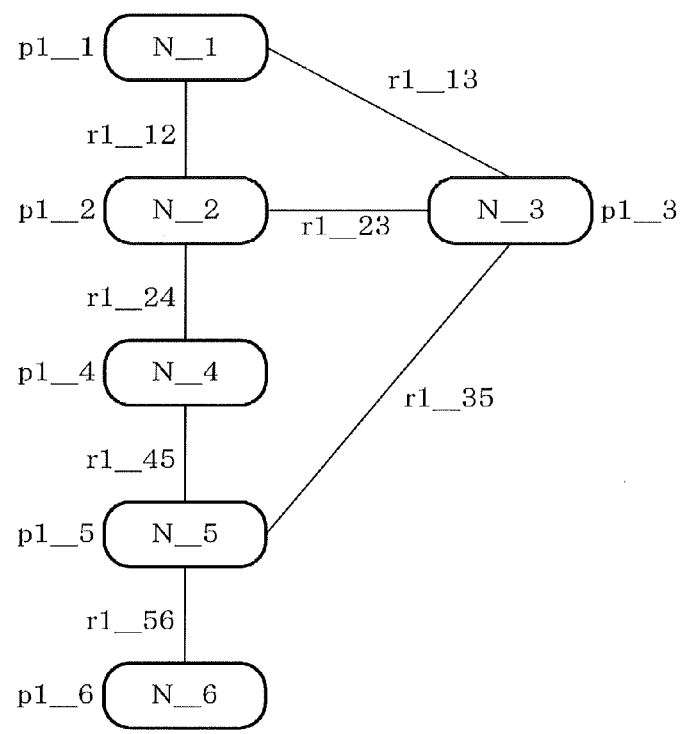
FIG. 5 is a diagram showing an example of a word network.
Figure 6:
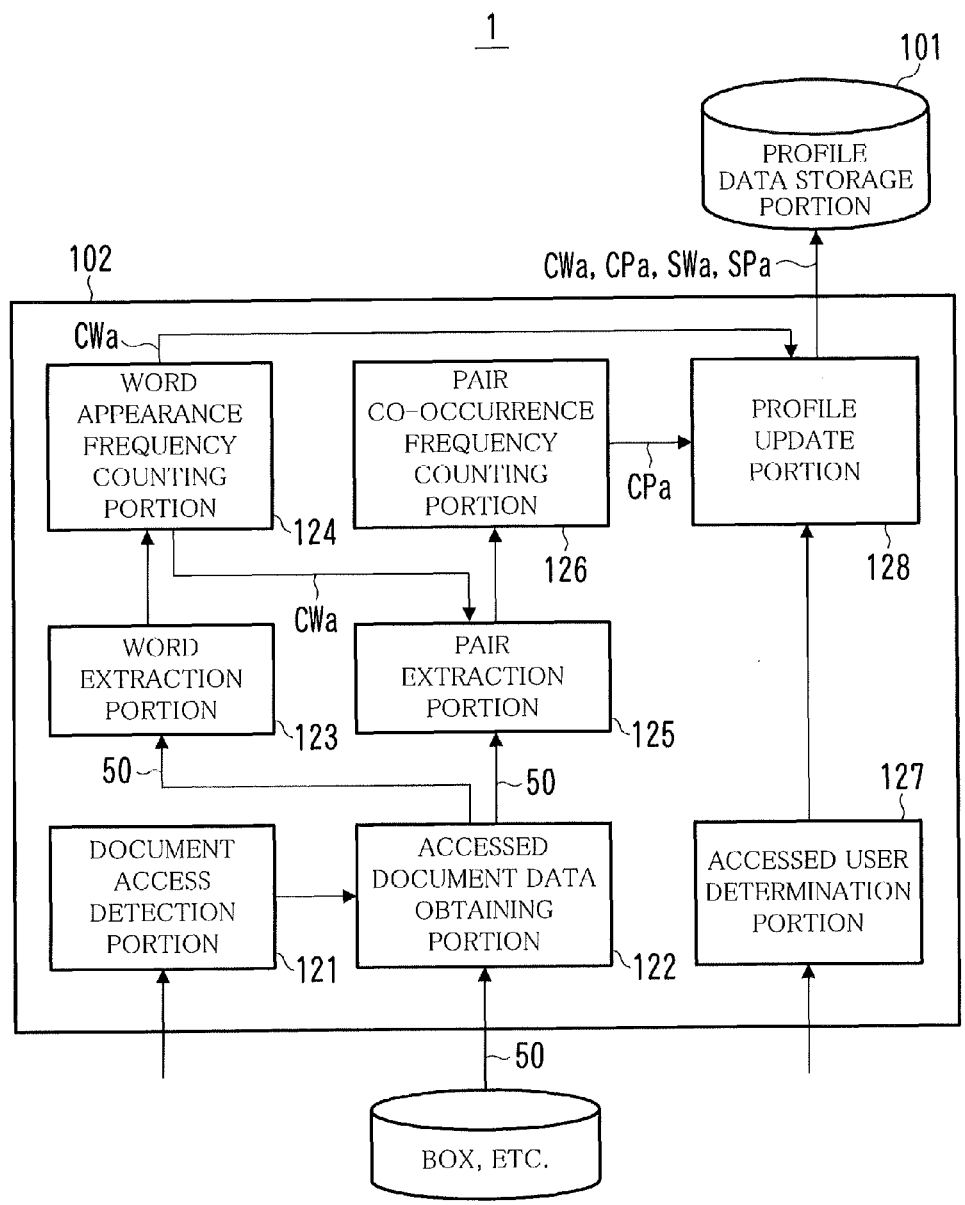
FIG. 6 is a diagram showing an example of the configuration of a profile registration processing portion.
Figure 7A:
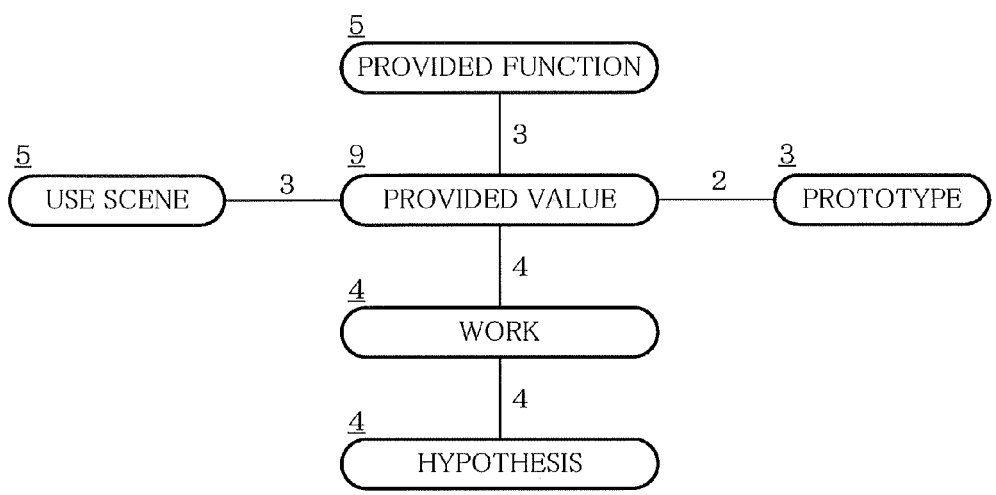
FIGS. 7A and 7B are diagrams showing an example of a word network for each document.
Figure 7B:
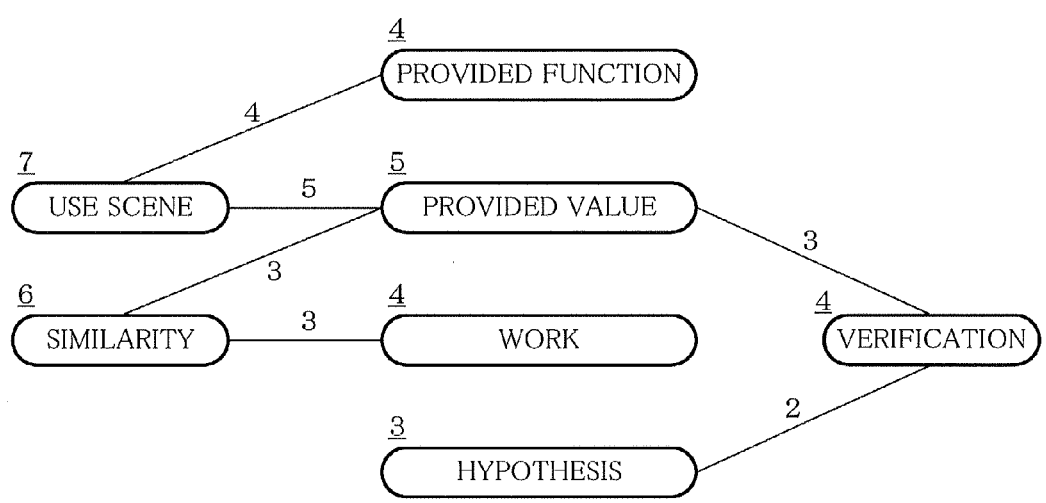
Figure 8:
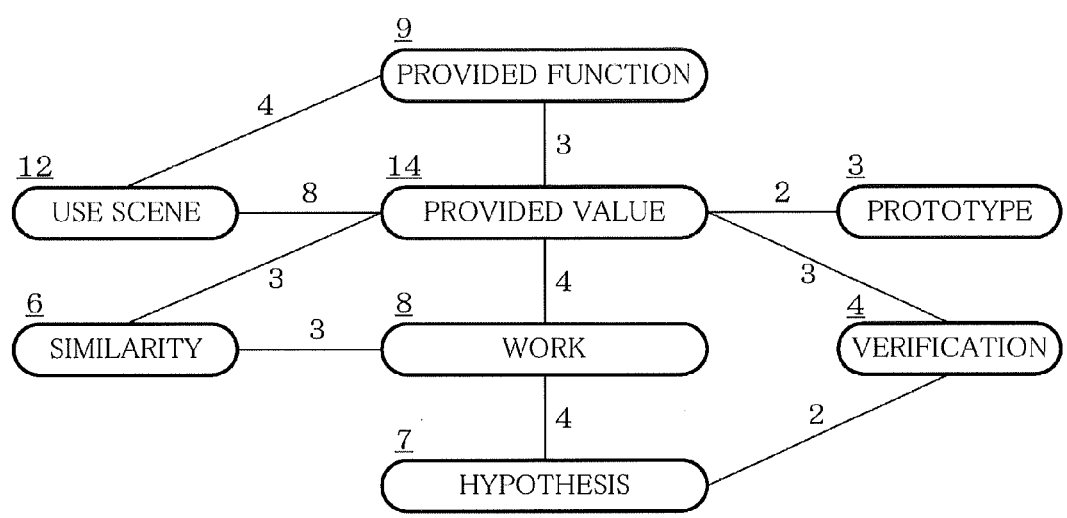
FIG. 8 is a diagram showing an example of an integrated word network.
Figure 9:
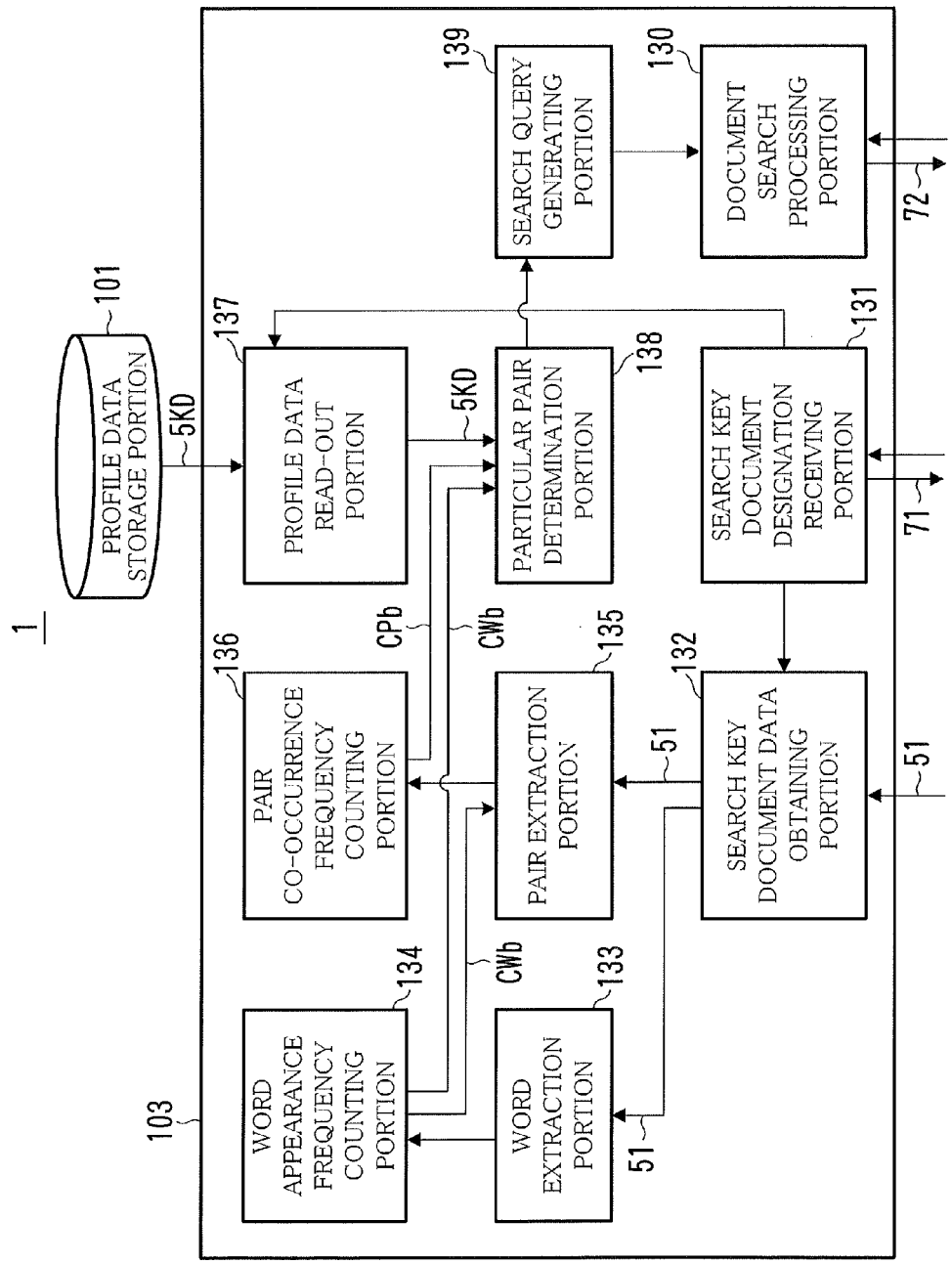
FIG. 9 is a diagram showing an example of the configuration of a document search portion.
Figure 10:
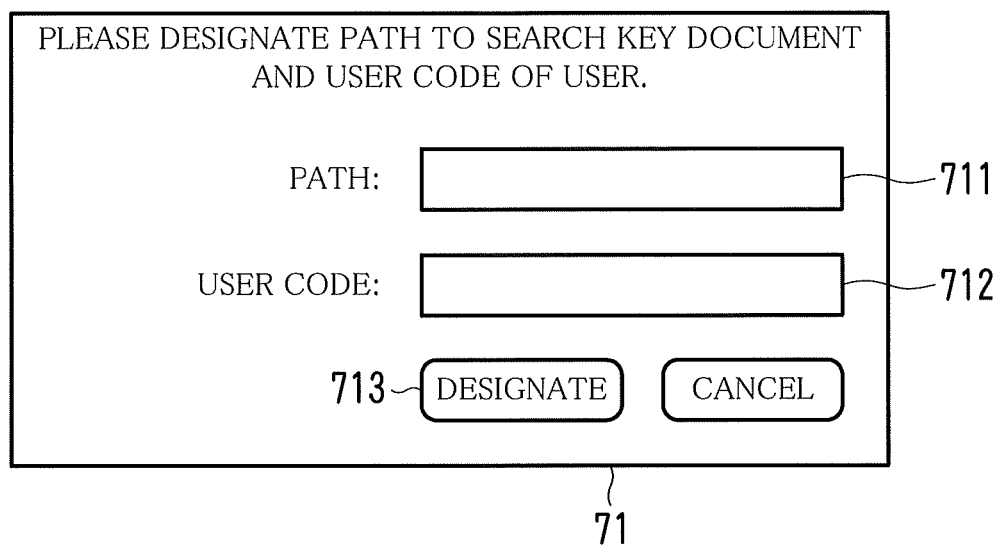
FIG. 10 is a diagram showing an example of a search command screen.

FIG. 4 is a diagram showing an example of the personal profile data 5KD. FIG. 5 is a diagram showing an example of a word network. FIG. 6 is a diagram showing an example of the configuration of the profile registration processing portion 102. FIGS. 7A and 7B are diagrams showing an example of a word network for each document. FIG. 8 is a diagram showing an example of an integrated word network. FIG. 9 is a diagram showing an example of the configuration of the document search portion 103. FIG. 10 is a diagram showing an example of a search command screen 71.

The description goes onto the functions of the portions of the image forming apparatus 1 shown in FIG. 3 with reference to the drawings of FIG. 4, and so on.

As mentioned above, the profile data storage portion 101 stores, therein, the personal profile data 5KD for each user.

As shown in FIG. 4, the personal profile data 5KD contains document-specific network data 5BD and general network data 5SD. The personal profile data 5KD is associated with a user code of a user to whom the subject personal profile data 5KD is given.

The document-specific network data 5BD is provided for each document to which the user gained access for use, and is associated with a document identifier for identifying the subject document.

The document-specific network data 5BD contains word list data 5WT and pair list data 5PT. The word list data 5WT indicates an appearance frequency CWa for each word. The "appearance frequency" indicates how many times the subject word is used in the document. The pair list data 5PT indicates a co-occurrence frequency CPa for each pair of two words. The "co-occurrence frequency" indicates how many times a sentence containing both the two words of the pair is used in the document. For example, when the document has seven sentences each of which contains the both words "VERIFICATION" and "HYPOTHESIS", the co-occurrence frequency CPa of the pair of "VERIFICATION and HYPOTHESIS" is 7.

Further, the word list data 5WT and the pair list data 5PT represent a relationship between the words in the entirety of the document. Hereinafter, such a relationship between the words is referred to as a "word network". For example, the document-specific network data 5BD having a document identifier of "B00001" shown in FIG. 4 represents a word network as shown in FIG. 5.

The general network data 5SD is collected data of the document-specific network data 5BD of each of the documents to which the user gained access. The general network data 5SD contains a word list data 5WU and a pair list data 5PU. The word list data 5WU indicates a total appearance frequency SWa on a word-by-word basis. The "total appearance frequency" is the sum of appearance frequencies CWa of the word in the documents to which the user gained access. The pair list data 5PU indicates a total co-occurrence frequency SPa on a pair-by-pair basis. The "total co-occurrence frequency" is the sum of co-occurrence frequencies CPa of the pair in the documents to which the user gained access.

As mentioned earlier, the profile registration processing portion 102 of FIG. 3 performs the processing for registering and updating the personal profile data 5KD. The details of the processing are provided below.

Referring to FIG. 6, the profile registration processing portion 102 is configured of a document access detection portion 121, an accessed document data obtaining portion 122, a word extraction portion 123, a word appearance frequency counting portion 124, a pair extraction portion 125, a pair co-occurrence frequency counting portion 126, an accessed user determination portion 127, a profile update portion 128, and so on.

The document access detection portion 121 detects access to a document by a user, for example, in the following manner.

The document access detection portion 121 monitors operation of a document viewing application. When data is opened with the application and an image of the document is displayed on the touch-sensitive panel display 10e, the document access detection portion 121 detects access to the document.

The accessed document data obtaining portion 122 obtains data on the document to which the user gained access (hereinafter, the data being referred to as "document data 50"), for example, in the following manner.

If the document data 50 is saved in a box, then the accessed document data obtaining portion 122 reads the document data 50 from the box to obtain the same. If the document data 50 is downloaded from a server on the Internet, then the accessed document data obtaining portion 122 reads the document data 50 from a predetermined folder for web browser (e.g., temporary folder) to obtain the same. If the predetermined folder does not have the document data 50, then the accessed document data obtaining portion 122 downloads the document data 50 from the server on the Internet to obtain the same.

Examples of the document data 50 are a Portable Document Format (PDF) file, a text file, a rich text file, and a file created by using an application for document creation. The same is similarly applied to document data 51 described later.

When the accessed document data obtaining portion 122 obtains the document data 50, the word extraction portion 123 extracts words used in a document indicated in the document data 50. The extraction may be made by using a known method. For example, a morphological analysis method may be used for the extraction. Only words corresponding to a specific part of speech, e.g., noun, are preferably extracted.

The word appearance frequency counting portion 124 counts the appearance frequency CWa for each of the words extracted by the word extraction portion 123.

The pair extraction portion 125 extracts two different words from each sentence used in the document, and makes a pair of the two words. If a certain sentence contains M different words (only the words corresponding to the specific part of speech extracted by the word extraction portion 123), then (M×(M−1)/2) pairs are extracted from the sentence. It is also possible to exclude, at the time of pairing, a word of which an appearance frequency CWa is smaller than a predetermined value α1, and not to use such a word for pairing. Alternatively, it is possible to exclude, at the time of pairing, a word of which a ratio of an appearance frequency CWa to the volume of the document (e.g., the number of all words or the number of all pages) is smaller than a predetermined value γ1, and not to use such a word for pairing.

The pair co-occurrence frequency counting portion 126 counts a co-occurrence frequency CPa for each of the pairs extracted by the pair extraction portion 125.

The accessed user determination portion 127 determines the user who gained access to the document. The determination may be made, for example, by inquiring of the operating system about a user currently logging in the image forming apparatus 1.

When the accessed user determination portion 127 finds out the user who gained access to the document, the profile update portion 128 updates the personal profile data 5KD (see FIG. 4) corresponding to the user in the following manner.

The profile update portion 128 generates, as the word list data 5WT, data indicating the words extracted by the word extraction portion 123 and the appearance frequency CWa, for each of the words, counted by the word appearance frequency counting portion 124. The profile update portion 128 also generates, as the pair list data 5PT, data indicating the pairs extracted by the pair extraction portion 125 and the co-occurrence frequency CPa, for each of the pairs, counted by the pair co-occurrence frequency counting portion 126. The profile update portion 128 then generates, as the document-specific network data 5BD, data containing the word list data 5WT and the pair list data 5PT. The profile update portion 128 associates the document-specific network data 5BD with the document identifier of the document, and adds the resultant to the personal profile data 5KD. It is possible not to incorporate, into the word list data 5WT, data on a word which is not contained in any of the pairs.

However, if the personal profile data 5KD of the user has not yet been stored in the profile data storage portion 101, then the profile update portion 128 generates personal profile data 5KD containing the general network data 5SD having word list data 5WU and pair list data 5PU both of which have no records, associates the personal profile data 5KD with the user code of the user, and saves the resultant to the profile data storage portion 101. Then, the document-specific network data 5BD thus generated is added to the personal profile data 5KD.

The profile update portion 128 also updates the general network data 5SD in the following manner.

The profile update portion 128 performs, for each of the words extracted by the word extraction portion 123, the following processing. The profile update portion 128 searches in the word list data 5WU for a record (row) for the word. The profile update portion 128 then adds the appearance frequency CWa of the word to the total appearance frequency SWa of the record. If there are no records for the word, then the profile update portion 128 generates a record that indicates the word and also indicates a value equal to the appearance frequency CWa as the total appearance frequency SWa, and adds the generated record to the word list data 5WU. Processing is not necessary on a word which is not contained in any of the pairs.

In parallel with the update of the word list data 5WU or before or after the same, the profile update portion 128 performs the following processing for each of the pairs extracted by the pair extraction portion 125. The profile update portion 128 searches for a record for the pair in the pair list data 5PU. The profile update portion 128 adds a co-occurrence frequency CPa of the pair to the total co-occurrence frequency SPa of the record. If there are no records for the pair, then the profile update portion 128 generates a record that indicates the pair and also indicates a value equal to the co-occurrence frequency CPa as the total co-occurrence frequency SPa, and adds the generated record to the pair list data 5PU.

The foregoing processing by the document access detection portion 121 through the profile update portion 128 is performed, so that the personal profile data 5KD is registered and updated.

Suppose that a user gained access to two documents up to now. Suppose also that the document-specific network data 5BD of the documents indicate the word networks respectively shown in FIG. 7A and FIG. 7B. In such a case, the profile registration processing portion 102 obtains the general network data 5SD representing a word network as that shown in FIG. 8. In FIGS. 7A, 7B, and 8, an appearance frequency of the corresponding word is denoted by an underlined numeral. A co-occurrence frequency of the corresponding pair is denoted by a numeral without underline. This is similarly applied to FIG. 12.

However, if the document-specific network data 5BD of a document to which a certain user previously gained access is registered in the personal profile data 5KD of the user, then the foregoing processing by the profile registration processing portion 102 is bypassed.

As mentioned earlier, the document search portion 103 of FIG. 3 searches for a document based on the personal profile data 5KD. When a document and a user are designated, the document search portion 103 searches for a document which is similar to the designated document and is of high interest to the user. The search method is detailed below.

Referring to FIG. 9, the document search portion 103 is configured of a search key document designation receiving portion 131, a search key document data obtaining portion 132, a word extraction portion 133, a word appearance frequency counting portion 134, a pair extraction portion 135, a pair co-occurrence frequency counting portion 136, a profile data read-out portion 137, a particular pair determination portion 138, a search query generating portion 139, a document search processing portion 130, and so on.

The search key document designation receiving portion 131 performs processing for receiving a designation of a document corresponding to a search key (hereinafter, the document being referred to as a "search key document") in the following manner.

The search key document designation receiving portion 131 displays the search command screen 71 shown in FIG. 10 on the touch-sensitive panel display 10e. A person who is to conduct a search enters a path to the document data 51 on a search key document into a text box 711 to designate the search key document. The person also enters a user code of a user into a text box 712 to designate the user. After that, the person touches a button 713. Hereinafter, the user designated is referred to as a "designated user".

In response to the designation, the search key document designation receiving portion 131 accepts the path entered into the text box 711 and the user code entered into the text box 712.

The person is also allowed to search for a document probably having a content which is of high interest to him/her. In such a case, the person enters his/her user code into the text box 712.

When the search key document designation receiving portion 131 accepts the path and the user code, the search key document data obtaining portion 132 obtains the document data 51 based on the path by reading the document data 51 from a box, or, downloading the document data 51 from a server, for example.

When the search key document data obtaining portion 132 obtains the document data 51, the word extraction portion 133 extracts words used in the document indicated in the document data 50. The extraction method is similar to that by the word extraction portion 123.

The word appearance frequency counting portion 134 counts an appearance frequency CWb for each of the words extracted by the word extraction portion 133.

The pair extraction portion 135 extracts a pair of two words from each sentence used in the document indicated in the document data 51. As with the case of the pair extraction portion 125 (see FIG. 6), it is possible to exclude, at the time of pairing, a word of which the appearance frequency CWb is smaller than a predetermined value $\alpha 2$, and not to use such a word for pairing. Alternatively, it is possible to exclude, at the time of pairing, a word of which a ratio of the appearance frequency CWb to the volume of the document is smaller than a predetermined value $\gamma 2$, and not to use such a word for pairing.

The pair co-occurrence frequency counting portion 136 counts a co-occurrence frequency CPb for each of the pairs extracted by the pair extraction portion 135.

The profile data read-out portion 137 reads, from the profile data storage portion 101, the personal profile data 5KD (see FIG. 4) associated with the user code accepted by the search key document designation receiving portion 131.

The particular pair determination portion 138 determines a particular pair based on the information obtained by the word extraction portion 133 through the profile data read-out portion 137. The "particular pair" herein is a pair that seems to be of high interest to the designated user among pairs appearing in the search key document. The description goes onto an example of the determination method with reference to a flowchart and so on.

[First Method]

Figure 11:
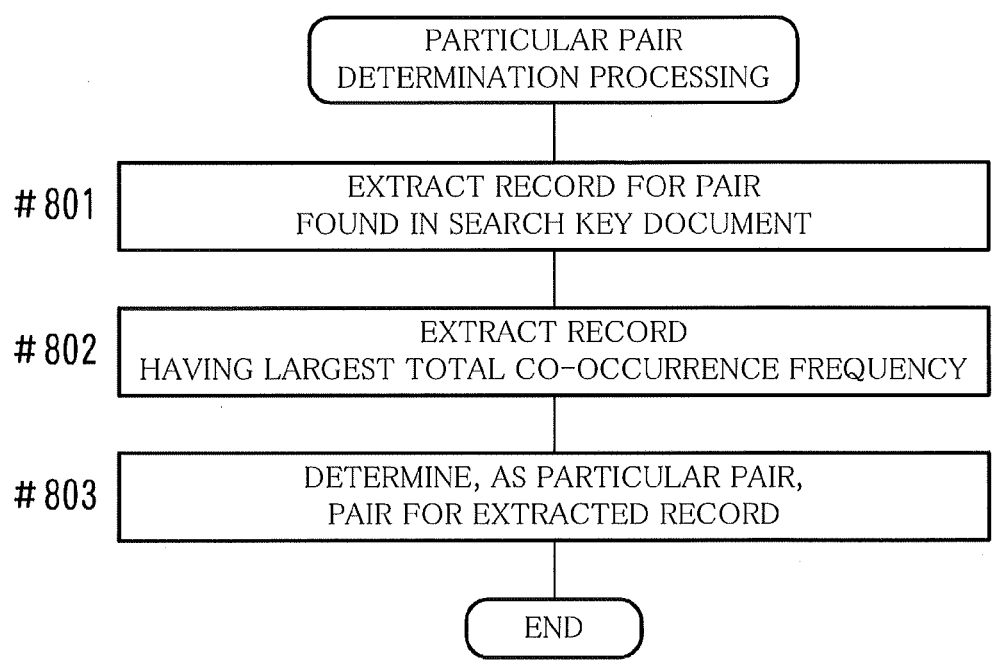
FIG. 11 is a flowchart depicting an example of the flow of particular pair determination processing.
Figure 12:
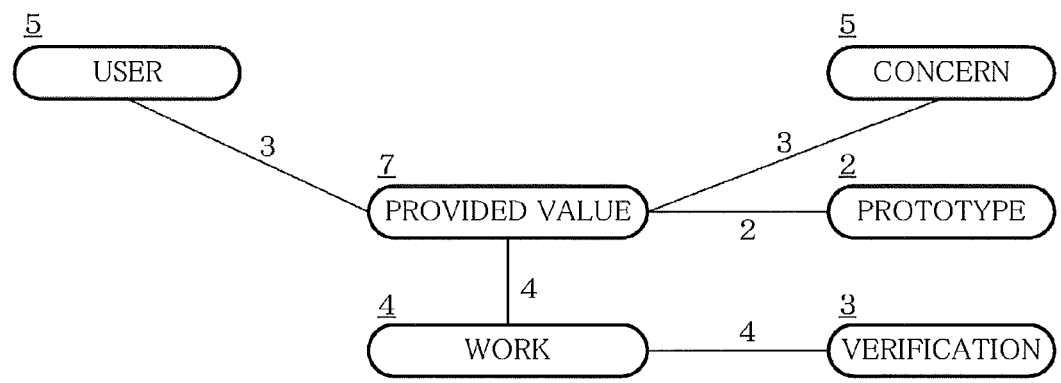
FIG. 12 is a diagram showing an example of a word network of a search key document.

FIG. 11 is a flowchart depicting an example of the flow of particular pair determination processing. FIG. 12 is a diagram showing an example of a word network of a search key document.

The particular pair determination portion 138 extracts a record for each of the pairs extracted by the pair extraction portion 135 from the pair list data 5PU of the personal profile data 5KD (Step #801 of FIG. 11). Among the extracted records, a record having the largest total co-occurrence frequency SPa is extracted (Step #802). The particular pair determination portion 138 then determines that a pair indicated in the extracted record is a particular pair (Step #803).

Suppose that a word network represented based on the pair list data 5PU is as that shown in FIG. 8, and that a word network represented based on the information obtained by the word extraction portion 133 through the pair co-occurrence frequency counting portion 136 is as that shown in FIG. 12. In such a case, as known from the comparison between both the word networks, a pair of "PROVIDED VALUE, WORK" and a pair of "PROVIDED VALUE, PROTOTYPE" are extracted. Among the two pairs, the pair of "PROVIDED VALUE, WORK" has the largest total co-occurrence frequency SPa. Thus, according to the processing by the particular pair determination portion 138, the pair of "PROVIDED VALUE, WORK" is determined to be a particular pair.

The pairs extracted by the pair extraction portion 135 possibly include pairs not so important.

In view of this, in Step #801, instead of extracting, from the pair list data 5PU of the personal profile data 5KD, the records for all the pairs extracted by the pair extraction portion 135, only records for the pairs having a co-occurrence frequency CPb equal to or greater than the predetermined value are preferably extracted. Alternatively, only records for the pairs of which a ratio of a co-occurrence frequency CPb to the volume of the search key document is equal to or greater than the predetermined value are preferably extracted.

If a plurality of pairs is extracted in Step #803, it is possible that, for each pair, the sum of total appearance frequencies SWa of two words making the pair is calculated and a pair having the largest sum of total appearance frequencies Swa is selected as the particular pair.

[Second Method]

Figure 13:
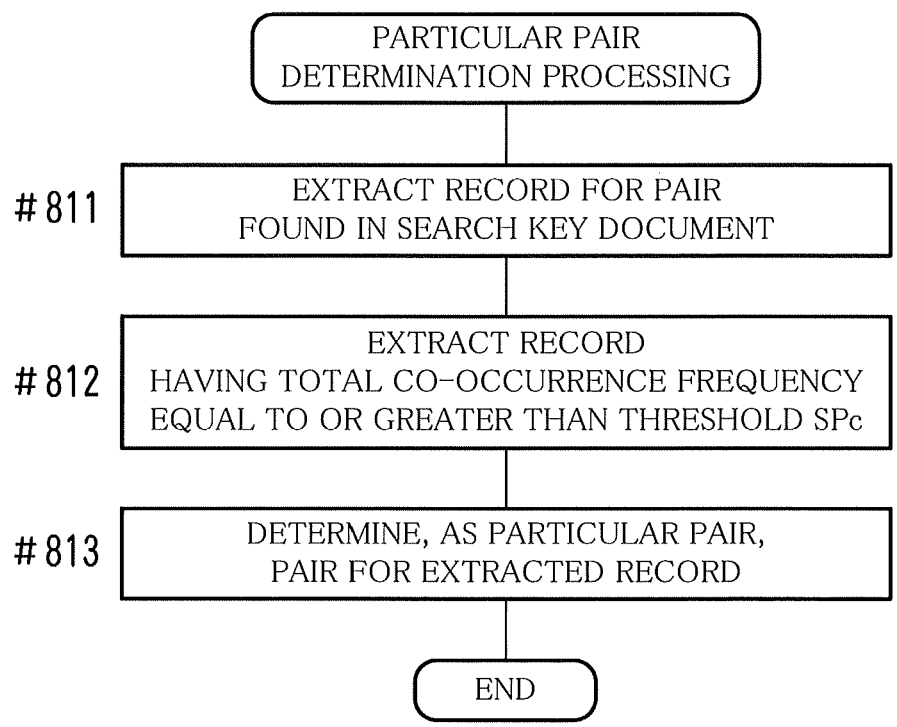
FIG. 13 is a flowchart depicting a modification of the flow of particular pair determination processing.

FIG. 13 is a flowchart depicting a modification of the flow of particular pair determination processing.

As with the first method, the particular pair determination portion 138 extracts a record for each of the pairs extracted by the pair extraction portion 135 from the pair list data 5PU of the personal profile data 5KD (Step #811 of FIG. 13). Among the extracted records, a record having the total co-occurrence frequency SPa equal to or greater than a threshold SPc is extracted (Step #812). The particular pair determination portion 138 then determines that a pair indicated in the extracted record is a particular pair (Step #813).

The threshold SPc is determined depending on the volume of documents to which the designated user gained access. The threshold SPc is determined by, for example, the following equation.

$$SPc = \beta \times BK$$

wherein "β" is a predetermined positive value, "BK" is the number of documents to which the designated user gained access, and "BK" is equal to the number of sets of document-specific network data 5BD contained in the personal profile data 5KD for the designated user. The volume of documents may be expressed in the number of words or the number of pages of all the documents to which the designated user gained access.

In short, according to the second method, all the pairs of which a ratio of the total co-occurrence frequency SPa to the volume of documents to which the user gained access is equal to or greater than a predetermined value are determined to be particular pairs.

[Third Method]

Figure 14:
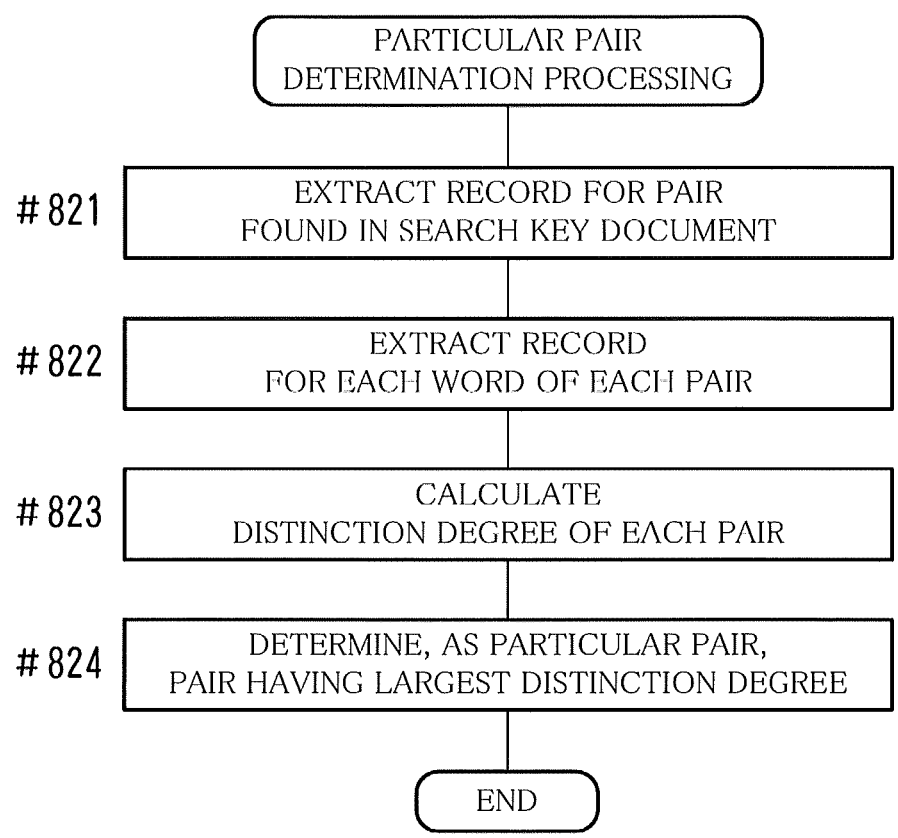
FIG. 14 is a flowchart depicting a modification of the flow of particular pair determination processing.

FIG. 14 is a flowchart depicting a modification of the flow of particular pair determination processing.

As with the first and second methods, the particular pair determination portion 138 extracts a record for each of the pairs extracted by the pair extraction portion 135 from the pair list data 5PU of the personal profile data 5KD (Step #821 of FIG. 14). The particular pair determination portion 138 then extracts, from the word list data 5WU, a record for each word making each of the extracted pairs (Step #822). The particular pair determination portion 138 calculates a distinction degree CR of each of the pairs based on the records (Step #823). The "distinction degree" is the sum of the total co-occurrence frequency SPa for the pair and the total appearance frequencies SWa for the two words making the pair. For example, if a word network represented based on the word list data 5WU and the pair list data 5PU is as that shown in FIG. 8, the distinction degree CR for the pair of "PROVIDED VALUE, WORK" is: 4+14+8=26. The distinction degree CR for the pair of "PROVIDED VALUE, PROTOTYPE" is: 2+14+3=19.

The particular pair determination portion 138 then determines that a pair having the largest distinction degree CR is a particular pair (Step #824).

Note that, as with the second method, all the pairs of which a ratio of the distinction degree CR to the volume of search key document is equal to or greater than a predetermined value are determined to be particular pairs.

Figure 15:
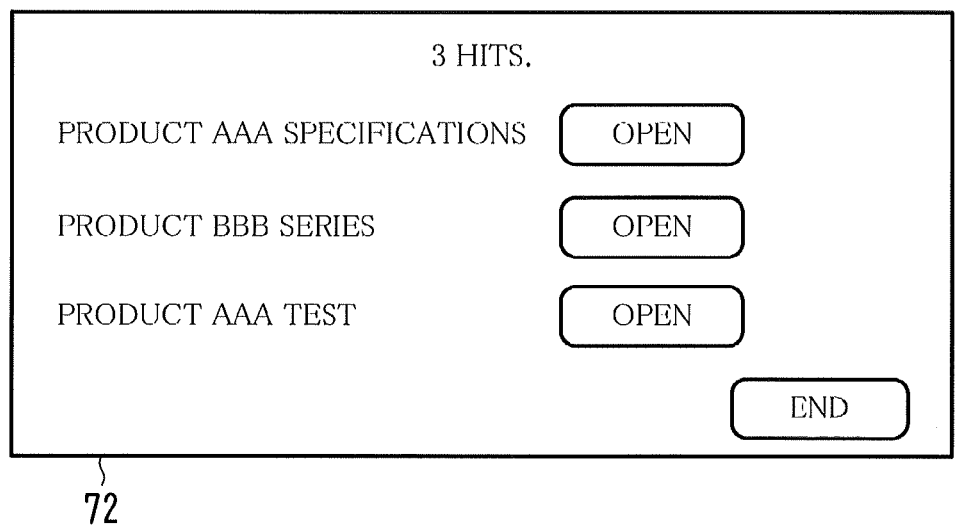
FIG. 15 is a diagram showing an example of a search result screen.

FIG. 15 shows an example of a search result screen 72.

Referring back to FIG. 9, when the particular pair determination portion 138 determines a particular pair, the search query generating portion 139 generates, as a search query (search formula), a formula in which two words making the particular pair are connected by an AND operator.

The document search processing portion 130 searches in a box or a storage of another device for document data on the document. Stated differently, the document search processing portion 130 searches for document data on the document containing the two words of the particular pair. After that, the search result screen 72 showing the search result as that in FIG. 15 is displayed on the touch-sensitive panel display 10e. The search may be conducted by a search engine of another device. In such a case, the search query is designated preferably to the search engine of another device.

If there is a plurality of particular pairs, then the search query generating portion 139 generates a search query for each of the pairs. The document search processing portion 130 conducts a search based on each of the search queries. Alternatively, a collective search may be conducted by connecting search queries with an OR operator such as "(PROVIDED VALUE AND WORK) OR (PROVIDED VALUE OR PROTOTYPE)".

Figure 16:
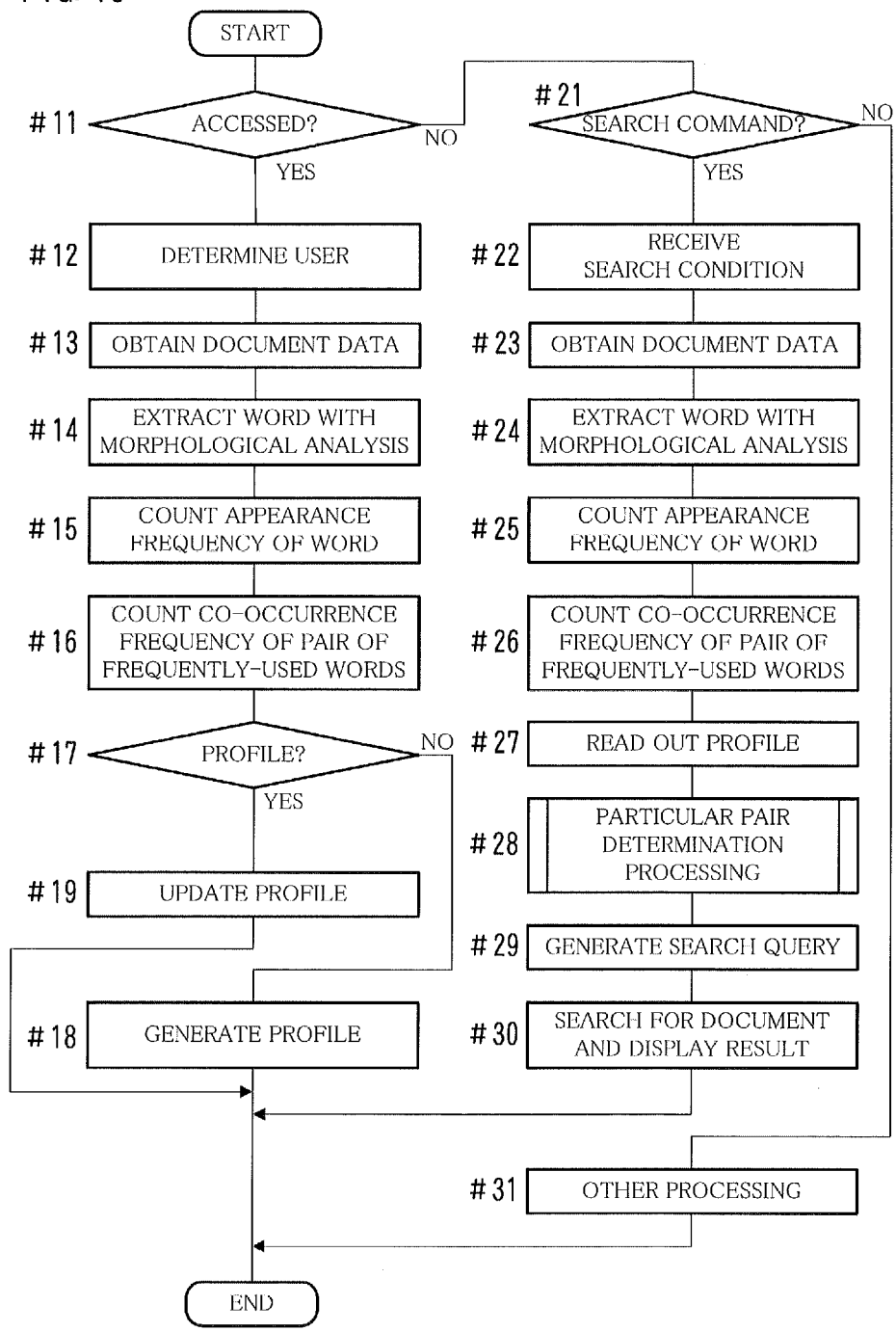
FIG. 16 is a flowchart depicting an example of the flow of the entire processing related to a document search.

FIG. 16 is a flowchart depicting an example of the flow of the entire processing related to a document search.

The description goes onto the flow of the entire processing related to a document search in the image forming apparatus 1 with reference to the flowchart of FIG. 16.

In response to the occurrence of an event, the image forming apparatus 1 performs processing depending on the event in the following manner.

When a document is accessed (Yes in Step #11), the image forming apparatus 1 determines a user who gave a command to access the document (Step #12). The image forming apparatus 1 obtains document data 50 on the document (Step #13), extracts words used in the document (Step #14), and counts the appearance frequency CWa of each of the words (Step #15). The image forming apparatus 1 also counts the co-occurrence frequency CPa of each pair of the words (Step #16). A word of which the appearance frequency CWa is smaller than the predetermined value α1 may be handled as if the word is not used in the document.

If there is no personal profile data 5KD (see FIG. 4) corresponding to the user (No in Step #17), then the image forming apparatus 1 generates personal profile data 5KD for the user based on the results of Steps #15 and #16 (Step #18). If there is personal profile data 5KD corresponding to the user (Yes in Step #17), then the image forming apparatus 1 updates the personal profile data 5KD based on the results of Steps #15 and #16 (Step #19).

When a person who is to conduct a search enters a predetermined command (No in Step #11, and Yes in Step #21), the image forming apparatus 1 displays the search command screen 71 (see FIG. 10), and receives search conditions of a path to the search key document and a user code of the user (Step #22).

The image forming apparatus 1 obtains document data 51 on the search key document (Step #23), extracts words used in the search key document (Step #24), and counts the appearance frequency CWb of each of the words (Step #25). The image forming apparatus 1 further counts the co-occurrence frequency CPb for pair of the words (Step #26). A word of which the appearance frequency CWb is smaller than the predetermined value α2 may be handled as if the word is not used in the document. In parallel with the processing from Steps #23-#26 or before or after the same, the image forming apparatus 1 reads the personal profile data 5KD of the user from the profile data storage portion 101 (Step #27).

The image forming apparatus 1 determines a particular pair based on the appearance frequency CWb of each of the words, the co-occurrence frequency CPb, and the personal profile data 5KD (Step #28). The determination method is similar to that discussed earlier with reference to FIGS. 11, 13, and 15.

The image forming apparatus 1 then generates a search query based on the particular pair thus determined (Step #29), searches for a document, and displays the search result as shown in FIG. 15 (Step #30).

If the occurred event corresponds to neither access to a document nor input of a predetermined search command (No in Step #11, and No in Step #21), then the image forming apparatus 1 performs conventional processing depending on the event (Step #31).

According to this embodiment, it is possible to determine a plurality of words to reflect interest of a specific user (in particular, a user designated by a person who is to conduct a search) more easily than with conventional methods.

In this embodiment, two words make a pair. Instead of this, three words or more may make a pair.

In this embodiment, as the co-occurrence frequency of a pair, the number of sentences in which the pair appears is used. Instead of this, a cluster other than sentence may be used. For example, the number of paragraphs in which the pair appears may be used as the co-occurrence frequency of the pair. Alternatively, the number of chapters, clauses, or sections in which the pair appears may be used as the co-occurrence frequency of the pair.

In this embodiment, a morphological analysis is used as a technology for extracting a word from a document. Instead of this, another technology may be used depending on a language used in the document. For example, in the case of a document described in English, a letter string delimited with space, comma, period, colon, or semicolon may be extracted as a word.

The person who is to conduct a search may designate, as the search key document, a document to which the designated user has ever obtained access. In such a case, data on words and pairs of the document is already contained in the personal profile data 5KD of the user. This eliminates the need for the search key document designation receiving portion 131 through the pair co-occurrence frequency counting portion 136 (see FIG. 9) to perform the processing. Instead of the result of the processing, the document-specific network data 5BD on the document contained in the personal profile data 5KD may be used to determine a particular pair.

Suppose that, for example, the person who is to conduct a search designates a document having a document identifier of "B00004" and a user code of "U0001", and that the personal profile data 5KD corresponding to "U0001" contains the document-specific network data 5BD corresponding to "B00004". In such a case, the determination of a particular pair may be made by using the appearance frequency CWa and the co-occurrence frequency CPa indicated in the document-specific network data 5BD, instead of using the appearance frequency CWb and the co-occurrence frequency CPb.

The foregoing embodiment takes the example of the case where the present invention is applied to the image forming apparatus 1. The present invention is also applicable to other information devices such as a personal computer, smartphone, mobile phone terminal, and server.

It is to be understood that the configurations of the intranet 4 and the image forming apparatus 1, the constituent elements thereof, the content and order of the processing, the configuration of data, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A device for determining interest, comprising:
   a storage device that stores, on a user-by-user basis, a co-occurrence frequency in correlation with a user, the co-occurrence frequency indicating how many times a pair of words is used in a same cluster of a first document, on a pair-by-pair basis, to which the user gained access previously;
   a hardware processor configured to:
      accept, from a person who is to conduct a search, designation of a second document and any one of a plurality of users; and
      determine that, among a plurality of pairs of words, a pair which is used in a same cluster of the designated second document and which also satisfies a predetermined condition of the co-occurrence frequency corresponding to the designated user is a particular pair in the second document.

2. The device according to claim 1, wherein the predetermined condition is that the co-occurrence frequency is higher than that of any other of the pairs.

3. The device according to claim 1, wherein the predetermined condition is that a ratio of the co-occurrence frequency to either one of a volume of the number of all words or a volume of the number of all pages in the first document is equal to or greater than a predetermined ratio.

4. The device according to claim 1, wherein the pair is a pair of words having a ratio of the co-occurrence frequency to either one of a volume of the number of all words or a volume of the number of all pages in the first document, wherein the ratio is equal to or greater than a predetermined ratio.

5. The device according to claim 1, wherein the hardware processor is further configured to search for a document containing all of words making a particular pair.

6. A method for determining interest, comprising:
   storing, on a user-by-user basis, a co-occurrence frequency in correlation with a user, the co-occurrence frequency indicating how many times a pair of words is used in a same cluster of a first document, on a pair-by-pair basis, to which the user gained access previously;
   receiving a designation of a second document and any one of a plurality of users; and
   determining that, among a plurality of pairs of words, a pair which is used in a same cluster of the designated second document and which also satisfies a predetermined condition of the co-occurrence frequency corresponding to the designated user is a particular pair in the second document.

7. The method according to claim 6, wherein the predetermined condition is that the co-occurrence frequency is higher than that of any other of the pairs.

8. The method according to claim 6, wherein the predetermined condition is that a ratio of the co-occurrence frequency to either one of a volume of the number of all words or a volume of the number of all pages in the first document is equal to or greater than a predetermined ratio.

9. The method according to claim 6, wherein the pair is a pair of words having a ratio of the co-occurrence frequency to either one of a volume of the number of all words or a volume of the number of all pages in the first document, wherein the ratio is equal to or greater than a predetermined ratio.

10. The method according to claim 6, comprising searching for a document containing all of words making a particular pair.

11. A non-transitory computer-readable storage medium storing thereon a computer program used in a computer, the computer program causing the computer to perform processing comprising:
    storing, on a user-by-user basis, a co-occurrence frequency in correlation with a user, the co-occurrence frequency indicating how many times a pair of words is used in a same cluster of a first document, on a pair-by-pair basis, to which the user gained access previously;
    receiving a designation of a second document and any one of a plurality of users; and
    determining that, among a plurality of pairs of words, a pair which is used in a same cluster of the designated second document and which also satisfies a predetermined condition of the co-occurrence frequency corresponding to the designated user is a particular pair in the second document.

12. The non-transitory computer-readable storage medium according to claim 11, wherein the predetermined condition is that the co-occurrence frequency is higher than that of any other of the pairs.

13. The non-transitory computer-readable storage medium according to claim 11, wherein the predetermined condition is that a ratio of the co-occurrence frequency to either one of a volume of the number of all words or a volume of the number of all pages in the first document is equal to or greater than a predetermined ratio.

14. The non-transitory computer-readable storage medium according to claim 11, wherein the pair is a pair of words having a ratio of the co-occurrence frequency to either one of a volume of the number of all words or a volume of the number of all pages in the first document, wherein the ratio is equal to or greater than a predetermined ratio.

15. The non-transitory computer-readable storage medium according to claim 11, comprising searching for a document containing all of words making a particular pair.

16. A device for determining interest, comprising:
    a storage device that stores, in association with a user, first pairs of words each having two words used in a document to which the user gained access previously, and a co-occurrence frequency of each of the first pairs of words; and
    a hardware processor configured to:
       determine that, among second pairs of words each having two words used in a document to which the user subsequently gains access, a pair of words matching at least one of the first pairs of words stored in association with the user in the storage device is a particular pair of words.

17. The device according to claim 16, wherein the hardware processor further determines that, among the particular pair of words, a pair of words has a highest co-occurrence frequency compared to any other pair of words.

18. The device according to claim 16, wherein the hardware processor searches for a document based on the particular pair of words.

* * * * *